(12) United States Patent
Furlong

(10) Patent No.: US 7,954,387 B1
(45) Date of Patent: Jun. 7, 2011

(54) ULTRASONIC TRANSDUCER DEVICE

(75) Inventor: Edward Randall Furlong, Beverly, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/858,886

(22) Filed: Aug. 18, 2010

(51) Int. Cl.
*G01F 1/66* (2006.01)
(52) U.S. Cl. .................................................. 73/861.28
(58) Field of Classification Search .............. 73/861.27, 73/861.28, 861.25, 703, 861
See application file for complete search history.

(56) References Cited

U.S. PATENT DOCUMENTS

| | | | |
|---|---|---|---|
| 3,978,731 A * | 9/1976 | Reeder et al. ................. | 73/703 |
| 5,426,980 A | 6/1995 | Smith | |
| 5,515,733 A | 5/1996 | Lynnworth | |
| 5,811,689 A * | 9/1998 | Collier et al. ............... | 73/861.28 |
| 6,615,674 B2 | 9/2003 | Ohnishi | |
| 7,140,261 B2 * | 11/2006 | Liu et al. ..................... | 73/861.25 |
| 7,463,158 B2 * | 12/2008 | Hatch et al. .................. | 340/627 |
| 7,562,584 B2 * | 7/2009 | Conquergood ................ | 73/861 |
| 7,607,359 B2 * | 10/2009 | Hecht et al. ................. | 73/861.27 |
| 2005/0204822 A1 | 9/2005 | Schumacher | |
| 2008/0271543 A1 * | 11/2008 | Hecht et al. ................. | 73/861.27 |

* cited by examiner

*Primary Examiner* — Jewel Thompson
(74) *Attorney, Agent, or Firm* — Global Patent Operation; Mark A. Conklin

(57) ABSTRACT

An ultrasonic transducer assembly includes a proximal end and an opposing distal end. The transducer assembly includes an outer housing and an electroacoustic signal generating element secured within the outer housing. The signal generating element transmits an ultrasonic signal at a characteristic frequency along an ultrasonic path that is perpendicular to the face of the generating element. An isolation diaphragm is coupled to the proximal end of the outer housing. The isolation diaphragm is thin relative to a characteristic wavelength of the diaphragm material. A fluidic transmission layer is disposed between the electroacoustic signal generating element and the isolation diaphragm. In one embodiment, the isolation diaphragm is at an angle relative to the proximal face of the electroacoustic signal generating element. In another embodiment, a flow meter includes the ultrasonic transducer assembly, and the isolation diaphragm substantially matches the contour of the flow passage within the flow meter body.

20 Claims, 3 Drawing Sheets

ULTRASONIC TRANSDUCER DEVICE

BACKGROUND OF THE INVENTION

The subject matter disclosed herein relates to ultrasonic transducers, and more particularly to an ultrasonic transducer having improved flow rate measurement accuracy.

Ultrasonic flow meters are used to determine the mean pipe flow rate ($V_m$) of a variety of fluids (e.g., liquids, gases, multiphase, etc.). Knowledge of the flow rate of the fluid can enable other physical properties or qualities of the fluid to be determined. For example, in some custody-transfer applications, the flow rate can be used to determine the volume (Q) of a fluid (e.g., oil or gas) being transferred from a seller to a buyer through a pipe to determine the costs for the transaction, where the volume is equal to the flow rate multiplied by the cross sectional area (A) of the pipe.

A conventional ultrasonic transducer typically includes a cylindrical housing with the ultrasonic transducer affixed within one end (usually the tip) and an electronics package mounted within the opposing end. An acoustic dampening material typically separates the two to prevent sound waves from reverberating inside the housing. The transducer crystal is fragile and therefore is not normally exposed to the medium being measured. Accordingly, the housing tip is typically hermetically sealed to prevent moisture and contaminants from entering the inner cavity where the transducer is located. Within the inner cavity, the transducer abuts the tip and propagates an ultrasonic signal through the tip material into the medium being measured. The planar face of the transducer crystal is perpendicular to (e.g., normal to) the direction of ultrasonic wave propagation. For applications in which the transducer is utilized as a flow meter, the ultrasonic transducer is then mounted through an access aperture in the fluid conduit.

One noted drawback to this approach is that the ultrasonic signal must first pass through the transducer tip material prior to entering the medium to be measured. The tip material may be quite thick to withstand the pressure of the fluid in the conduit, which in one example is several thousand pounds per square inch (psi). The thick tip material may absorb or otherwise attenuate the ultrasonic signal, causing degraded performance such as decreased signal-to-noise ratio. Furthermore, due to the tip thickness, the probe tip or face must be perpendicular to the direction of propagation. Otherwise, the thickness of the tip material will skew the wave propagation path, leading to measurement errors.

In one type of ultrasonic flow meter employing transit time flow metering, one or more pairs of ultrasonic transducers can be mounted to a pipe (or spool piece attached to a pipeline). Each pair can contain transducers located upstream and downstream from each other forming an ultrasonic path between them. Each transducer, when energized, transmits an ultrasonic signal (e.g., a sound wave) along an ultrasonic path through the flowing fluid that is received by and detected by the other transducer. The path velocity (i.e., path or chord velocity (Vp)) of the fluid averaged along an ultrasonic path can be determined as a function of the differential between (i) the transit time of an ultrasonic signal traveling along the ultrasonic path from the downstream transducer upstream to the upstream transducer against the fluid flow direction, and (2) the transit time of an ultrasonic signal traveling along the ultrasonic path from the upstream transducer downstream to the downstream transducer with the fluid flow direction.

One type of transit time flow meter used in industrial and commercial applications is a flare gas flow meter, which measures the flow rate in a combustible gas that is vented to atmosphere and subsequently burned. Combustible gases are common byproducts in oil refinery operations, oil drilling and exploration, and industrial processes, for example. The safest manner in which to dispose of the combustible gas is to vent it to atmosphere and ignite it. However, environmental regulations sometimes require the flare gas operator to document the amount of combustible gas burned in the atmosphere over a given period of time. The flare gas flow meter allows the operator to measure and document the gas flow in order to remain in compliance with regulations.

Ultrasonic flare gas flow measurement typically utilizes at least one pair of transducers as described above, each transducer being fitted within a probe. Since the flare gas typically flows through the pipe at a very high velocity (e.g., 150 m/s), accurate measurements may be difficult if the probes are spaced far apart, as may be the case in large diameter pipe. Therefore, in some applications each transducer probe protrudes into the flare gas pipe approximately one quarter of the pipe diameter. Each probe protruding into the pipe reduces the separation distance between the probe pair, which allows for a more accurate measurement.

Several problems with this approach arise. One noted problem is that the probes are large and present obstructions to the flow. Due to the dynamic forces in the high velocity flow, the probes may begin to shake or vibrate. The vibration may induce fatigue stress. Also, the velocity of the fluid may tend to bend the probe, either elastically or permanently. In either case, the probe may eventually fail.

Another type of transit time flow meter is a multi-phase flow meter, which measures the flow rate in pipes that contain more than one phase, such as liquid and solid. One example of a multi-phase flow may be found in oil drilling operations, where sand particles are admixed with the liquid oil flowing in the pipe. The sand particles tend to interfere with the ultrasonic waves being transmitted between sensors. One solution to this problem is to insert the probes into the pipe to minimize the distance between the transducers, similar to the flare gas application. One drawback to this approach is that the sand particles erode the probe tips and, over time, cause the probe to fail.

Another type of flow meter is a custody transfer flow meter, which necessitates a very accurate flow measurement. Custody transfer flow meters often measure expensive (and sometimes volatile) fluids such as gasoline. Safety regulations prohibit obstructions in the pipe flow path (such as probes) that could pose an ignition hazard. Therefore, the transducers are typically recess-mounted in the pipe. Due to the geometries involved (e.g., the upstream and downstream cross-mounting) and the requirement that the probe face is perpendicular to the wave propagation, the recess-mounted transducer will form recesses or cavities in the conduit wall. One drawback to this approach is that the flow meters with recessed transducers, such as those found in liquid custody transfer or multiphase flow meters, may experience erosion and blockage in the cavities formed by the recess. In some configurations, the flow velocity passing over the recess forms eddies which, if solid particles such as sand were present in the flow, erode the cavity and conduit. In other configurations, solid particles can settle into the cavities and obstruct the ultrasonic path, leading to erroneous readings.

It would be advantageous to improve flow rate measurement accuracy without inserting the transducer probe into the fluid stream, or recessing the probe from the inner wall of the fluid conduit.

BRIEF DESCRIPTION OF THE INVENTION

In one aspect of the invention, an ultrasonic transducer is provided that improves accuracy by increasing signal-tonoise ratio. The transducer assembly includes a proximal end oriented towards a medium to be a measured, and an opposing distal end. The transducer assembly includes an outer housing and an electronics package coupled to the distal end of the outer housing. An electroacoustic signal generating element is secured within the outer housing. The generating element transmits an ultrasonic signal at a characteristic frequency along an ultrasonic path that is perpendicular to the face of the generating element. An isolation diaphragm is coupled to the proximal end of the outer housing. The isolation diaphragm is thin relative to a characteristic wavelength of the diaphragm material. A fluidic transmission layer is disposed between the electroacoustic signal generating element and the isolation diaphragm.

In another aspect of the invention, a flow meter is provided having a flow meter body with a flow passage therethrough. The flow meter body includes an aperture extending from an outer surface to the flow passage. A transducer assembly is disposed in the aperture. The transducer assembly includes an outer housing, an electroacoustic signal generating element secured within the outer housing, an isolation diaphragm coupled to a proximal end of the outer housing, and a fluidic transmission layer disposed between the electroacoustic signal generating element and the isolation diaphragm. The isolation diaphragm substantially matches the contour of the flow passage in the flow meter body, and a thickness of the isolation diaphragm is at least an order of magnitude less than a characteristic wavelength of the diaphragm material.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. Thus, for further understanding of the invention, reference can be made to the following detailed description, read in connection with the drawings in which.

DETAILED DESCRIPTION OF THE INVENTION

Figure 1:
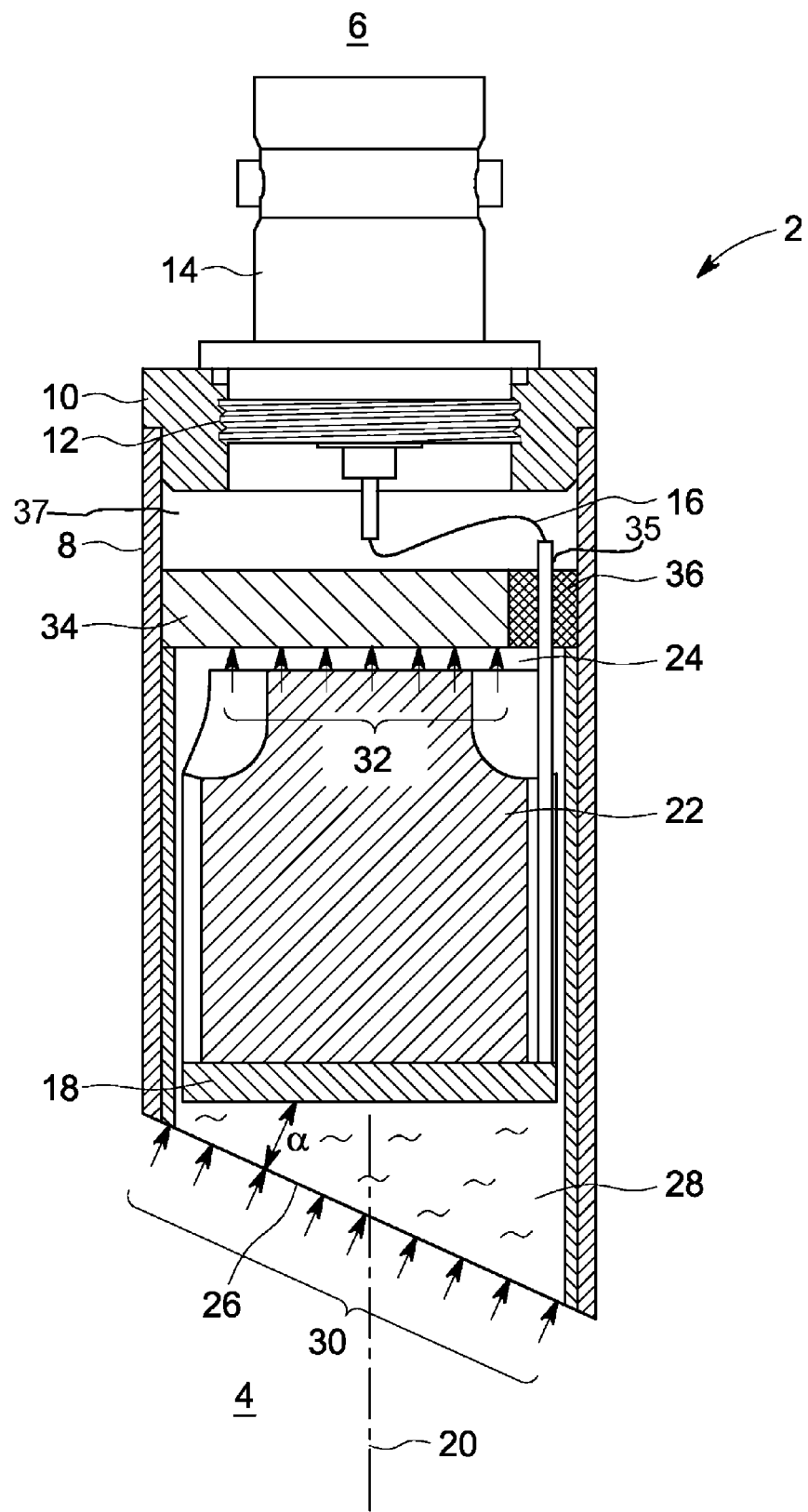
FIG. 1 is a schematic cross-section of a transducer assembly according to one exemplary embodiment of the invention.

Referring to FIG. 1, which shows a schematic cross-section of a transducer assembly according to one exemplary embodiment of the invention, an ultrasonic transducer assembly 2 includes a proximal end 4 oriented towards a medium to be measured and an opposing distal end 6. The transducer assembly 2 further includes an outer housing 8 which may be cylindrical in shape. The outer housing 8 of the transducer assembly 2 may be metallic, e.g., aluminum, stainless steel or titanium, or may be plastic. If plastic, it is preferably shielded electrically on the inside. An end cap 10 secured to the distal end 6 of the outer housing 8 includes a threaded bore 12 to removably secure an electronics package 14 to the transducer assembly 2. For example, the outer housing 8 and the end cap 10 may be fabricated from stainless steel and electron beam welded to form a unitary construction.

Within the housing 8, an electrical lead 16 conducts electrical signals from the electronics package 14 to an electroacoustic signal generating element 18, which in the disclosed embodiment is a piezoelectric crystal. The wafer-shaped crystal 18 transmits and receives ultrasonic signals along an ultrasonic path 20 perpendicular to the planar face of the crystal 18. Transmission of ultrasonic signals is responsive to a voltage applied to the crystal 18, while voltage is generated at the crystal 18 upon reception of ultrasonic signals.

The electroacoustic signal generating element 18 may alternately include a type known as micromachined ultrasonic transducers (MUTs), which may be of the capacitive (cMUT) or piezoelectric (pMUT) variety. cMUTs are tiny diaphragm-like devices with electrodes that convert the sound vibration of a received ultrasound signal into a modulated capacitance. For transmission the capacitive charge is modulated to vibrate the diaphragm of the device and thereby transmit a sound wave.

The transducer assembly 2 may further include an acoustic dampening compound 22 disposed on the back side of the electroacoustic signal generating element 18. The acoustic dampening compound 22 minimizes reverberation of the ultrasound signal within the inner chamber 24 of the transducer assembly 2, thereby increasing the performance of the transducer. The acoustic dampening compound 22 may be comprised of tungsten-loaded epoxy, or graphite. In some constructions, the acoustic dampening compound 22 may serve as a buffer to isolate delicate internal components from environmental extremes, such as high temperature applications.

The transducer assembly 2 further includes an isolation diaphragm 26 coupled to the proximal end 4 of the outer housing 8. In one example, the coupling is implemented by welding. The diaphragm 26 isolates the medium being measured, such as fluid flow, from internal components of the transducer. In some fluid flow measurement applications, the fluid pressure may be several thousand pounds per square inch. Therefore, prior art ultrasonic transducers typically were fabricated from high strength metals such as stainless steel or titanium, and the diaphragm typically measured 0.080 to 0.100 inches thick to withstand the large pressure differential.

In contrast, the isolation diaphragm 26 of the disclosed transducer assembly 2 is quite thin. The minimum thickness of the isolation diaphragm 26 may be limited only by manufacturing practicalities. Thus, in one example, the thickness of the isolation diaphragm 26 is 0.02-0.50 millimeters (0.001-0.020 inches). In another example, the thickness of the isolation diaphragm 26 may be in the range of 0.07-0.13 millimeters (0.003-0.005 inches). Candidate materials for the isolation diaphragm 26 include metallic foils, such as stainless steel, titanium, or aluminum. The maximum thickness of the isolation diaphragm 26 is limited by the characteristic wavelength of the diaphragm material. In one embodiment, the thickness of the diaphragm 26 may be thin relative to the characteristic wavelength of the diaphragm material, so that the acoustic energy being transmitted and received by the electroacoustic signal generating element 18 does not become attenuated or reflected back into the housing or off on an angle. The characteristic wavelength $\lambda_c$ of the isolation diaphragm material may be defined as the distance a sound waveform travels between its peaks, or $$\lambda_c = c/f \qquad (1)$$

where c is the speed of sound of the material and f is the characteristic frequency of the ultrasonic signal. In one example, the speed of sound in aluminum is 5960 meters per second and the frequency of the ultrasonic pulse is 1 MHz. The characteristic wavelength is thus 5.969 millimeters (0.235 inches). The thickness of the isolation diaphragm 26 may be expressed as a ratio or fraction of the characteristic wavelength. In one example, the thickness is one tenth, or one order of magnitude, less than the characteristic wavelength. In another example, the thickness is one one-hundredth, or two orders of magnitude, less than the characteristic wavelength. In any event, the thickness of the isolation diaphragm 26 is much less than the characteristic wavelength.

To eliminate the pressure differential across the isolation diaphragm 26, a fluidic transmission layer 28 is disposed between the distal side of the isolation diaphragm 26 and the proximal face of the electroacoustic signal generating element 18. The fluidic transmission layer 28 may be a liquid or a gel, but not a solid. For example, if the fluidic transmission layer 28 is a liquid, candidate liquids may include water, oil, silicon oil, or glycerol. If the fluidic transmission layer 28 is a gel, candidate gels may include petroleum jelly, grease, polymeric gel, polyurethane gel, or silicone gel. The fluidic transmission layer 28 may fill the entire inner chamber 24 of the transducer assembly 2.

The fluidic transmission layer 28 serves at least two beneficial purposes. In one aspect, the layer 28 acts as a fluid matching layer to better couple the ultrasonic signal to the medium being measured. For example, if the transducer assembly 2 forms part of an ultrasonic flow meter measuring crude oil flow, the fluidic transmission layer 28 may comprise silicon oil. In this manner, the sound wave from the electroacoustic signal generating element 18 travels through the silicon oil, through the isolation diaphragm 26, and through the flowing crude oil. Because the thickness of the isolation diaphragm 26 is much less than the characteristic wavelength, very little loss of signal integrity is encountered through the transmission layer. And, because the fluid characteristics of the transmission layer 28 closely match the flow being measured, very little loss of signal integrity is encountered. Thus, the disclosed transducer assembly 2 provides superior signal-to-noise ratio over transducers in the prior art.

In another beneficial aspect, the wetted boundary 30 of the transducer assembly 2 remains in the same location, e.g., against the fluid to be measured, but the pressure boundary 32 (e.g., the surfaces reacting the fluid pressure) is relocated away from wetted boundary 30. In the disclosed example, the pressure boundary 32 is relocated behind the electroacoustic signal generating element 18 to a backplate 34. The backplate 34 may be of any suitable construction and thickness to withstand the pressure forces. In one example, the backplate 34 is stainless steel, 2.54 millimeters (0.100 inches) thick, and welded to the outer housing 8. In another example (not shown), the pressure boundary 32 is against the proximal face of the electroacoustic signal generating element 18. In either case, the pressure drop or differential pressure across the isolation diaphragm 26 is eliminated because the fluidic transmission layer 28 transfers the reaction forces to another location within the transducer.

The relocation of the pressure boundary 32 allows the isolation diaphragm 26 to be positioned at an angle α relative to the proximal face of the electroacoustic signal generating element 18 without deflecting the ultrasonic signal from the ultrasonic path 20. In this manner, the isolation diaphragm 26 may be fabricated to substantially match the inner contour of a pipe surface. For example, if the disclosed transducer assembly 2 forms part of an ultrasonic flow meter that is mounted through an access aperture in a fluid conduit, the diaphragm 26 may have a curvature matching the inner diameter of the conduit.

In some constructions, portions of the electrical lead 16 will be exposed to the pressures in the fluidic transmission layer 28. As illustrated in FIG. 1, the pressure boundary 32 exerts fluid pressure on the backplate 34, which may be several thousand pounds per square inch. To prevent the fluid from leaking (e.g., wicking) along a central conductor 35 to an unpressurized zone such as cavity 37, the transducer assembly 2 may include a metal-to-glass seal 36.

Figure 2:
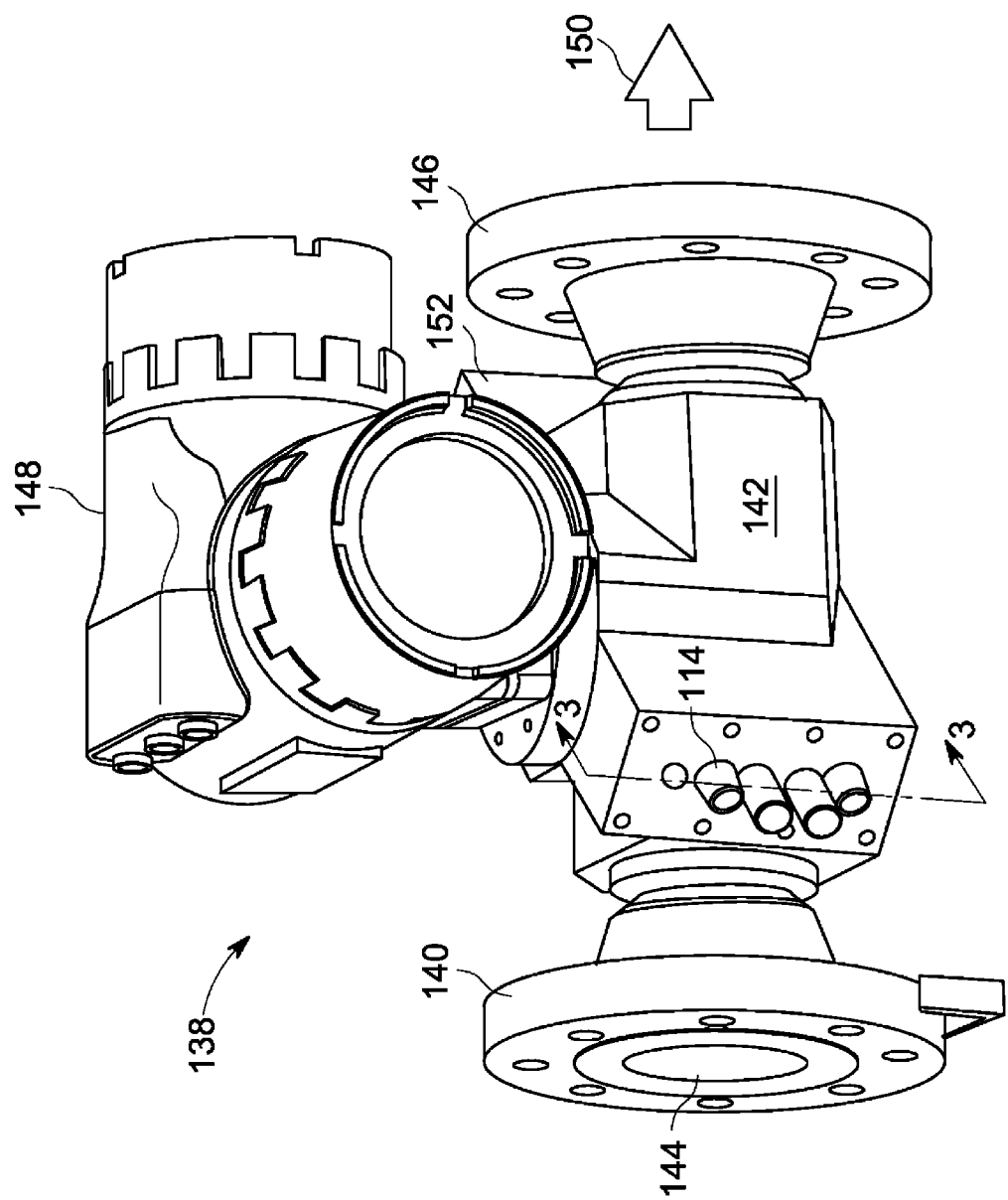
FIG. 2 is a perspective view of a custody transfer flow meter utilizing a transducer assembly according to another exemplary embodiment of the invention.

Referring to FIG. 2, wherein like numerals indicate like elements from FIG. 1, a perspective view of a custody transfer flow meter utilizing a transducer assembly according to another exemplary embodiment of the invention is shown. A transducer assembly 102 according to the present disclosure is shown as part of a liquid custody transfer (LCT) ultrasonic flow meter 138 that is mounted in a spool piece configuration. The LCT flow meters typically meter crude oil, distillates, gasoline, diesel fuel or the like from a refinery operation. The LCT flow meters require 0.15% accuracy or better, due to the high volume flow and high retail price of the commodity.

The flow meter 138 includes an upstream flange 140 to mate with a portion of an upstream custody transfer conduit, a main body 142 to provide a flow passage 144 and ultrasonic measurement of a custody transfer fluid, a downstream flange 146 to mate with a downstream portion of the custody transfer conduit, and an electronics module 148 to route electrical wiring from the transducers. The body 142 is positioned at an oblique angle (e.g., at a 45° angle) relative to the custody transfer fluid flow direction 150 in order to provide upstream and downstream velocities for the ultrasonic transducer paths, as will be explained below. Mounted to the main body 142 are an upstream cover (not shown) and a downstream cover 152 to close off and seal the transducer assemblies 102 to allow the wiring to be routed through the electronics module 148 mounted atop the flow meter 138.

Figure 3:
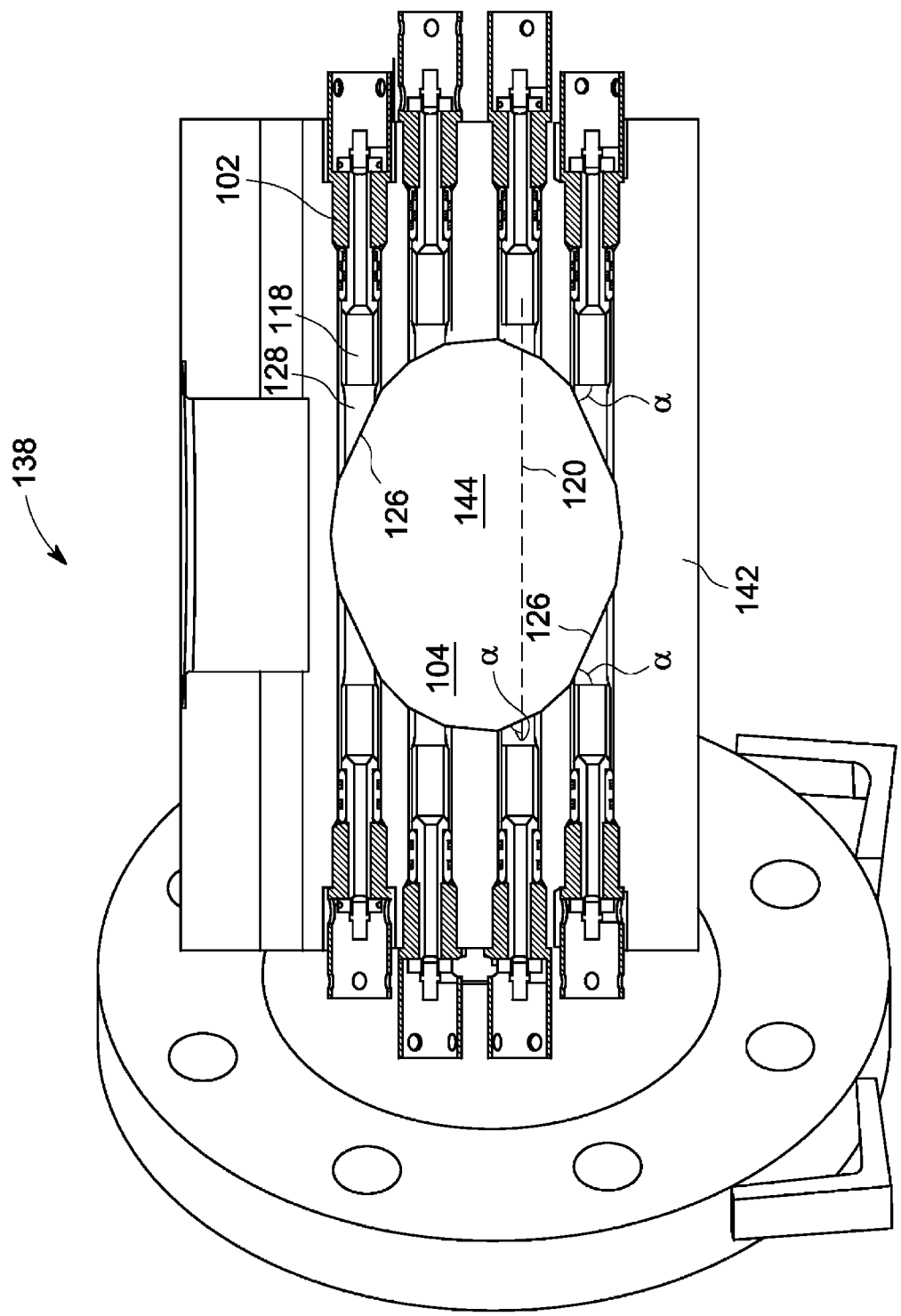
FIG. 3 is a cross-sectional schematic view of the custody transfer flow meter and transducer assembly of FIG. 2.

Turning to FIG. 3, wherein like numerals indicate like elements from FIG. 1, a cross-sectional schematic view of the custody transfer flow meter and transducer assembly of FIG. 2 is shown. The flow meter 138 is shown in cross section along the flow meter body 142 with the electronics module 148 removed for clarity. Because the flow meter 138 is installed obliquely to the flow axis of the spool piece, the cross-sectional view of the flow passage 144 appears elliptical when in fact it is round.

The flow meter 138 includes four pair of ultrasonic transducer assemblies 102, the proximal end 104 of each transducer in facing relationship to each other at opposite sides of the body 142. The four pair of transducers sample the flow profile in the flow meter and determine the actual flow rate by interpolating across the four sections. Each transducer assembly 102 includes an electroacoustic signal generating element 118 that emits an ultrasonic pulse across the custody transfer fluid flow path to the opposing transducer in the pair. In the illustrated embodiment, the four transducer assemblies 102 on the left side of the drawing emit pulses in the downstream flow direction, and the four transducer assemblies 102 on the right side of the drawing emit pulses in the upstream flow direction.

Each transducer assembly 102 includes an isolation diaphragm 126 that substantially matches the contour of the inner wall of the flow passageway. A fluidic transmission layer 128 is disposed between the distal side of the isolation diaphragm 126 and the proximal face of an electroacoustic signal generating element 118. As can be appreciated with respect to the various installations and geometries shown in FIG. 3, the angle α of the isolation diaphragm 126 relative to the proximal face of the electroacoustic signal generating element 118 varies according to the location within the pipe. In one example, the pair of transducer assemblies 102 may be located such that the ultrasonic path 120 passes through the centerline of the flow passage. In that example, the angle α would be zero, e.g., the isolation diaphragm 126 would be parallel to the face of the generating element 118. In another example, the pair of transducer assemblies 102 may be positioned to bisect approximately the quarter chord of the flow passage, as illustrated by the dashed line in FIG. 3. In that particular example, the angle α of the isolation diaphragm 126 relative to the face of the generating element 118 may be in a range of approximately 30-45 degrees. In yet another example, wherein the pair of transducer assemblies 102 may be positioned to bisect only a small portion of the flow passageway, the angle α of the isolation diaphragm 126 relative to the face of the generating element 118 may be approximately 60 degrees. This example is illustrated by the top and bottom pair of transducers in FIG. 3.

An advantage that may be realized in the practice of some embodiments of the described transducer assembly is that the isolation diaphragm may be configured to substantially match the contour of the inner wall of the flow passage. Thus, a transducer assembly according to an embodiment of the present invention, when installed in a flare gas flow meter, would not encounter the problems associated with transducer probe erosion and vibration.

A further advantage that may be realized when the isolation diaphragm substantially matches the contour of the inner wall of the flow passage is that, when installed in a liquid custody transfer or multiphase flow meter, the problems associated with erosion and blockage in the recess cavities are eliminated.

Another advantage that may be realized in the practice of some embodiments of the described transducer assembly is that the disclosed transducer assembly will not induce local flow perturbations in the vicinity of the access aperture. Local flow perturbations arise because a foreign object (e.g., the transducer) is introduced to the flow stream. Although not detrimental to the structural integrity of the transducer assembly, the flow perturbations necessitate software modifications to compensate for the decreased signal-to-noise ratio. The software compensation is time-consuming and is based upon trial and error.

Another advantage that may be realized in the practice of some embodiments of the described transducer assembly is that the transducer assembly does not transmit ultrasonic sound to the structural surfaces of the pipe or conduit. Thus, the cross-talk phenomenon or short-circuit noise between transducers is minimized, which improves timing accuracy and signal-to-noise ratio.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

For example, the disclosed transducer assembly may be utilized in a Doppler flow meter. In the mode utilizing the Doppler effect, the flow rate is determined by measuring a rate of particle or bubble flowing with the fluid, under the assumption that the particle or bubble moves at a rate equal to that of the moving fluid. The moving rate of the particle or bubble can be determined by detecting variation of ultrasonic frequency from that of an ultrasonic wave applied to the moving particle or bubble to that of an ultrasonic wave reflected to the moving particle or bubble.

In another example, the transducer assembly may be utilized not to determine flow rate, but to detect the presence of foreign material in a flow stream, such as sand.

What is claimed is:

1. An ultrasonic transducer assembly having a proximal end and an opposing distal end, the proximal end oriented towards a medium to be a measured, the transducer assembly comprising:
   an outer housing;
   an electronics package coupled to the distal end of the outer housing;
   an electroacoustic signal generating element secured within the outer housing, the generating element formed from a material and comprising a proximal face defining an ultrasonic path for transmission of an ultrasonic signal, the ultrasonic path being perpendicular to the proximal face, the ultrasonic signal having a characteristic frequency;
   an electrical lead for conducting electrical signals from the electronics package to the electroacoustic signal generating element;
   an acoustic dampening compound disposed within the outer housing on the distal side of the electroacoustic signal generating element;
   an isolation diaphragm coupled to the proximal end of the outer housing, the isolation diaphragm characterized by a material having a thickness, the diaphragm thickness being thin relative to a characteristic wavelength of the diaphragm material; and
   a fluidic transmission layer disposed between the proximal face of the electroacoustic signal generating element and the distal surface of the isolation diaphragm.

2. The ultrasonic transducer assembly of claim 1, wherein the isolation diaphragm is at an angle relative to the proximal face of the electroacoustic signal generating element.

3. The ultrasonic transducer assembly of claim 2, wherein the angle is within a range of 0 to 60 degrees.

4. The ultrasonic transducer assembly of claim 3, wherein the angle is within a range of 30 to 45 degrees.

5. The ultrasonic transducer assembly of claim 1, wherein the fluidic transmission layer is an oil.

6. The ultrasonic transducer assembly of claim 5, wherein the fluidic transmission layer is silicon oil.

7. The ultrasonic transducer assembly of claim 1, wherein the fluidic transmission layer is a gel.

8. The ultrasonic transducer assembly of claim 1, wherein the thickness of the isolation diaphragm is at least an order of magnitude less than the characteristic wavelength.

9. The ultrasonic transducer assembly of claim 1, wherein the thickness of the isolation diaphragm is at least two orders of magnitude less than the characteristic wavelength.

10. The ultrasonic transducer assembly of claim 8, wherein the thickness of the isolation diaphragm is in the range of 0.02 to 0.50 millimeters.

11. The ultrasonic transducer assembly of claim 10, wherein the thickness of the isolation diaphragm is in the range of 0.07 to 0.13 millimeters.

12. The ultrasonic transducer assembly of claim 1, wherein the material of the isolation diaphragm is stainless steel.

13. The ultrasonic transducer assembly of claim 1, wherein the acoustic dampening compound is a buffer to isolate components within the outer housing from environmental extremes.

14. The ultrasonic transducer assembly of claim 1, wherein the electrical lead is secured in a glass-to-metal seal.

15. A flow meter comprising:
a flow meter body having a flow passage therethrough, the flow meter body defining an aperture extending from an outer surface to the flow passage;
a transducer assembly disposed in the aperture, the transducer assembly comprising an outer housing, an electroacoustic signal generating element secured within the outer housing, an isolation diaphragm coupled to a proximal end of the outer housing, and a fluidic transmission layer disposed between the electroacoustic signal generating element and the isolation diaphragm;
an electronics module coupled to the flow meter body; and
wherein the isolation diaphragm substantially matches the contour of the flow passage in the flow meter body, and a thickness of the isolation diaphragm is at least an order of magnitude less than a characteristic wavelength of the diaphragm material.

16. The flow meter of claim 15, wherein the electroacoustic signal generating element and the fluidic transmission layer are sealed from the outer surface of the flow meter body by a glass-to-metal seal.

17. The flow meter of claim 15, wherein the thickness of the isolation diaphragm is in the range of 0.02 to 0.50 millimeters.

18. The flow meter of claim 15, wherein the thickness of the isolation diaphragm is in the range of 0.07 to 0.13 millimeters.

19. The flow meter of claim 15, wherein the fluidic transmission layer is silicon oil.

20. An ultrasonic transducer assembly having a proximal end and an opposing distal end, the proximal end oriented towards a medium to be a measured, the transducer assembly comprising:
an outer housing;
a electronics package coupled to the distal end of the outer housing;
an electroacoustic signal generating element secured within the outer housing, the generating element formed from a material and comprising a proximal face defining a ultrasonic path for transmission of an ultrasonic signal, the ultrasonic path being perpendicular to the proximal face, the ultrasonic signal having a characteristic frequency;
an electrical lead for conducting electrical signals from the electronics package to the electroacoustic signal generating element;
an acoustic dampening compound disposed within the outer housing on the distal side of the electroacoustic signal generating element;
an isolation diaphragm coupled to the proximal end of the outer housing, the isolation diaphragm characterized by a material having a thickness, the thickness of the diaphragm being at least an order of magnitude less than a characteristic wavelength of the diaphragm material, the isolation diaphragm being at an angle relative to the proximal face of the electroacoustic signal generating element; and
a fluidic transmission layer disposed between the proximal face of the electroacoustic signal generating element and the distal surface of the isolation diaphragm.

\* \* \* \* \*

UNITED STATES PATENT AND TRADEMARK OFFICE
CERTIFICATE OF CORRECTION

PATENT NO. : 7,954,387 B1
APPLICATION NO. : 12/858886
DATED : June 7, 2011
INVENTOR(S) : Furlong It is certified that error appears in the above-identified patent and that said Letters Patent is hereby corrected as shown below:

In Column 4, Line 67, in Equation (1), delete "$\lambda_c c/f$" and insert -- $\lambda_c = c/f$ --, therefor.

Signed and Sealed this
Fourth Day of October, 2011

David J. Kappos
*Director of the United States Patent and Trademark Office*